Oct. 14, 1958    R. G. AREY    2,856,490
THERMOSTATIC DEVICES
Filed April 17, 1957    2 Sheets-Sheet 2

Ralph G. Arey,
Inventor.
Koenig and Pope,
Attorneys.

United States Patent Office 2,856,490
Patented Oct. 14, 1958

2,856,490

THERMOSTATIC DEVICES

Ralph G. Arey, Brockton, Mass., assignor to Metals & Control Corporation, Attleboro, Mass., a corporation of Massachusetts Application April 17, 1957, Serial No. 653,479

25 Claims. (Cl. 200—138)

This invention relates to thermostatic devices, and more particularly to thermostatic movements and thermostatic switches. The term "thermostatic movement" is used in a sense corresponding to the term "mechanical movement."

Among the several objects of the invention may be noted the provision of a thermostatic movement in which bending of a thermostatic blade is translated directly and efficiently into rotary motion; the provision of a thermostatic movement of this character adapted to obtain a rotary motion of substantial magnitude and to develop substantial force; the provision of a thermostatic switch which utilizes the stated thermostatic movement to obtain the desirable effect of increase in switch contact pressure upon heating; the provision of a thermostatic switch of this character which may be constructed so as to be dynamically balanced in cases where it may be subject to vibration in use; and the provision of thermostatic movements and switches such as described which are of economical construction and reliable in operation. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, Fig. 1 is a view in elevation illustrating a thermostatic movement of this invention;

Corresponding reference characters indicate corresponding parts throughout the several views of the drawings.

Figure 1:
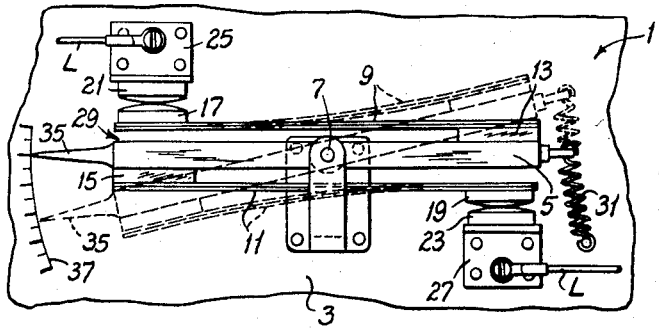

Referring to the drawings, Fig. 1 illustrates a thermostatic movement 1 of this invention which is powered by heat induced by flow of current therethrough and which is adapted to translate the thermostatic response of the device into rotary motion of substantial magnitude as for measuring or control purposes. As shown in Fig. 1, the device comprises a support 3 which may be a vertical insulating plate, for example. A rotary member constituted by an electrically conductive lever 5 is pivoted on the support for rotation on a horizontal axis at 7. This axis is at the center of the length of the lever.

The lever 5 carries a pair of thermostatic elements 9 and 11. Each of these is a current-carrying electrical resistance bimetallic blade adapted to be heated by passage of current therethrough. The blade 9 has one end fixed at 13 to the top of the lever at one end of the lever and extends as a cantilever toward the other end of the lever above the lever and in the plane of rotation of the lever. The blade 11 has one end fixed at 15 to the bottom of the lever at the other end of the lever and extends as a cantilever toward the other end of the lever below the lever and in the plane of rotation of the lever. The blades are arranged for bending in opposite directions in the plane of rotation of the lever in response to temperature change. For example, each blade has its high expansion side on the inside toward the lever, and hence bends in response to heating so that its side toward the lever is convex.

Blade 9 has a contact 17 at its free end on the outside. Blade 11 has a contact 19 at its free end on the outside. Contacts 17 and 19 are respectively engageable outwardly with fixed contacts 21 and 23 carried by terminal brackets 25 and 27 mounted on the supporting plate 3. The unit comprising the assembly of the lever 5 and blades 9 and 11 is designated in its entirety by the reference character 29. It may be regarded as an S-shaped unit mounted for rotation on an axis at the center of the S. It is biased to rotate clockwise as viewed in Fig. 1 as by means of a tension spring 31. Hence contact 17 is biased against fixed contact 21 and contact 19 is biased against fixed contact 23. Lines by which the device is connected in an electrical circuit are indicated at L. By way of example, lever 5 is shown as having a pointer 35 at one end which is movable over scale markings 37 on the supporting plate 3.

The blades 9 and 11 normally are generally straight and extend as shown in solid lines in Fig. 1 generally parallel to the lever 5, and the lever is normally horizontal. Upon passage of current through the blades and the lever, and resultant heating of the blades, the blades bend, each becoming convex on its high expansion side which faces the lever. Since the free ends of the blades are restrained against outward movement by the engagement of contacts 17 and 19 with fixed contacts 21 and 23, the bending of the blades results in counterclockwise rotation of the lever 5 against the bias of spring 31 to a position such as illustrated in dotted lines in Fig. 1. The degree of rotation may be read on the scale 37. As will be readily understood, this reading may serve as a measurement of the value of current flowing in the device, for example. The higher the value of the current and the more the bending of the blades, the greater is the pressure of contacts 17 and 19 on contacts 21 and 23. Since the device acts with substantial force from the two thermostatic blades it may be used to operate devices requiring substantial operating forces, as by connecting a driving linkage at some point on the bar 5.

Figs. 2–6 illustrate a thermostatic switch utilizing the basic principles of the above-described thermostatic movement 1. Figs. 2–6 also further illustrate details applicable to the device 1. As shown therein, the supporting insulating plate 3 has a bottom horizontal flange 39. A U-shaped bracket 41 is mounted on the plate 3 by means of a block 43. The lever 5 is a flat bar having a pivot pin 45 journalled in the bracket 41. Projecting endwise from one end of the lever 5 (its left end as shown) is an arm 47. A compression spring 49 carried in a cup 51 having a stem 53 threaded in the bottom flange 39 of plate 3 acts against the arm 47 through an insulation button 55 to bias the S-shaped unit or assembly 29 clockwise. This spring 49 takes the place of the spring 31 shown in Fig. 1. Pointer 35 and scale 37 of Fig. 1 are not used in the thermostatic switch, and hence do not appear in Figs. 2–4.

Projecting endwise from the other end of the lever 5 (its right end as shown) is a latch bar 57 having a downwardly bent portion 59 providing a latch shoulder at 61 and having an end portion 63 angled down and away from the S-shaped unit or assembly 29. Mounted on the supporting plate 3 at the right of unit 29 is a horizontal cylindrical guide 65 for a plunger 67. This plunger is biased in the direction away from unit 29 by a spring 69, and constitutes a driver for the lever 5. It extends out of the guide 65 toward the left and carries on its left end a U-shaped member 71 adapted to receive the angled end portion 63 of the latch bar 57. Spring 69 is stronger than spring 49.

Figure 2:
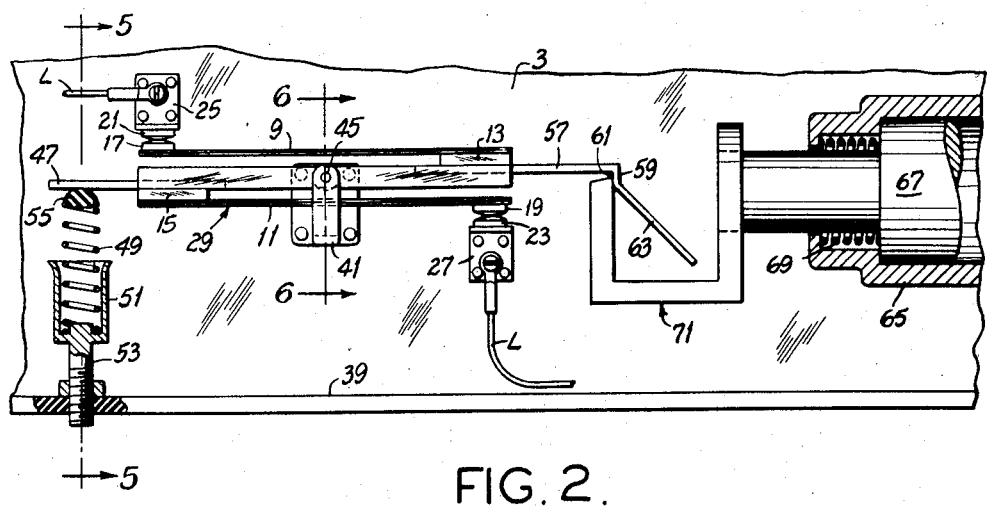
Fig. 2 is a view in elevation illustrating a thermostatic switch of this invention.
Figure 3:
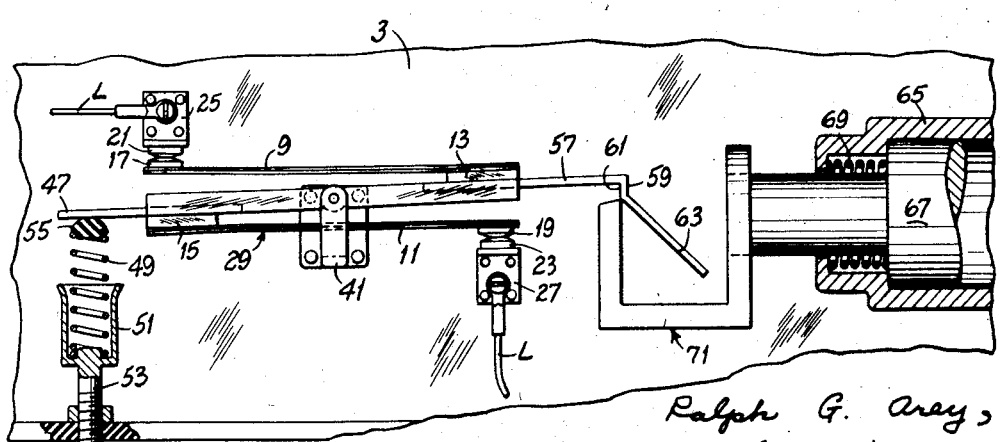
Figs. 3 and 4 are views similar to Fig. 2 illustrating moved positions of parts.
Figure 4:
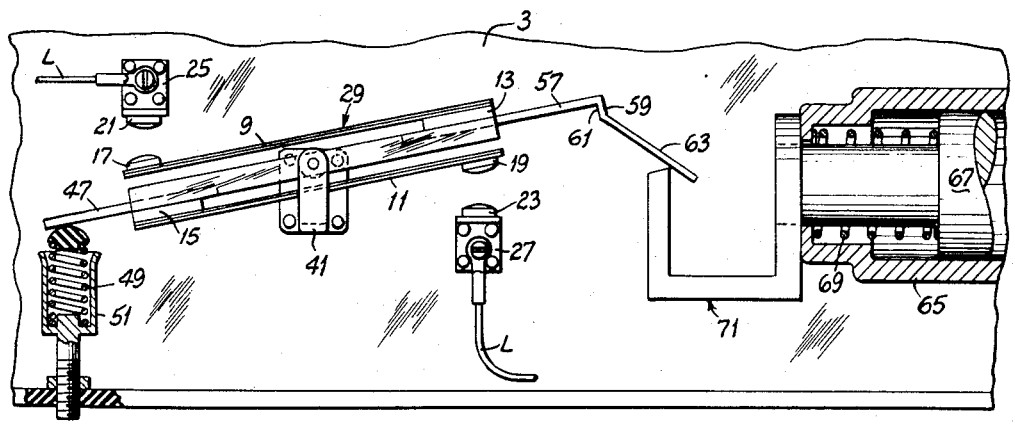
Figure 5:
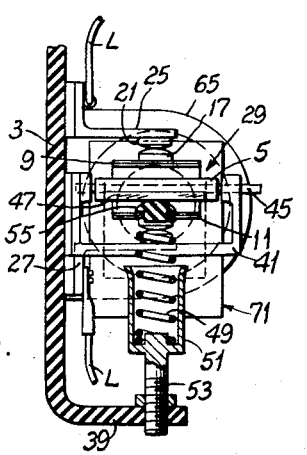
Fig. 5 is a vertical transverse section taken on line 5—5 of Fig. 2.
Figure 6:
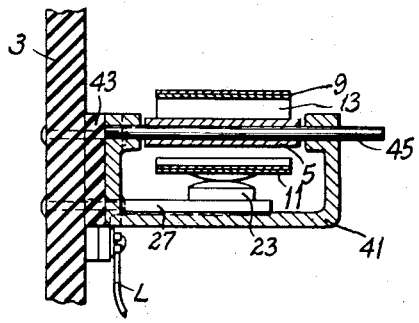
Fig. 6 is an enlarged vertical transverse section taken on line 6—6 of Fig. 2.

Fig. 2 shows the switch in closed condition with the thermostatic blades unheated. In this condition, the lever 5 is generally horizontal. The plunger 67 is latched in a leftward position against the bias of the plunger spring 69 by engagement of the upper end of the left side of the U-shaped member 71 with the shoulder 61. As the blades 9 and 11 heat up and bend in response to passage of current therethrough, the lever 5 rotates counterclockwise against the bias of spring 49. The pressure of contacts 17 and 19 on fixed contacts 21 and 23 increases. Upon heating of the blades sufficiently to make them bend to the extent illustrated in Fig. 3 where shoulder 61 is shown as raised just above the upper end of the left side of the U-shaped member by 71, the plunger 67 is released to be driven to the right by spring 69. The upper end of the left side of the U-shaped member 71 thereupon acts as a cam on the angled portion 63 of bar 57 quickly to rotate the unit 29 counterclockwise against the bias of spring 49 to the position shown in Fig. 4 wherein contacts 17 and 19 are separated from the contacts 21 and 23 to open the circuit. The blades 9 and 11 then cool (Fig. 4 showing them as having cooled and returned to their unheated condition), and the switch may then be reclosed by pushing the plunger 67 to the left to return the parts to the positions shown in Fig. 2. The point at which the switch opens may be varied by adjusting the spring cup 51 to vary the bias of spring 49 on the unit 29.

The effect of the above-described arrangement to increase the pressure of contacts 17 and 19 on fixed contacts 21 and 23 upon heating (unlike conventional arrangements in which contact pressure decreases on heating) is most advantageous in that it maintains contact resistance at a minimum and minimizes arcing. The S-shaped unit 29 may be readily constructed so that it is dynamically balanced in respect to its pivotal axis at 7, thereby minimizing the switch-opening effects of vibration.

Figure 7:
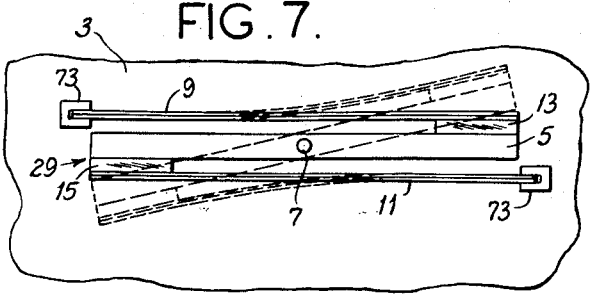
Fig. 7 is a view similar to Fig. 1 illustrating a modification.

Fig. 7 illustrates a variation of the thermostatic movement shown in Fig. 1 in which the left end of blade 9 and the right end of blade 11 may be restrained against rotation in either direction about axis 7 by means such as the clips indicated at 73 fixed to supporting plate 3. Then no biasing spring such as the spring 31 of Fig. 1 is needed. The Fig. 7 device may be either an ambient temperature responsive device or a current-carrying device, means 73 in the latter case being electrical terminals.

The use of the two thermostatic blades 9 and 11 arranged as shown is such that the force derived from the thermostatic bending of one blade is additive to the force derived from the thermostatic bending of the other. If the amount of force needed is low, the device may consist, for example, of a rotary member such as the lever 5 and only one blade. This may be visualized by considering Fig. 7 with blade 11 removed.

In view of the above, it will be seen that the several objects of the invention are achieved and other advantageous results attained.

As various changes could be made in the constructions without departing from the scope of the invention, it is intended that all matter contained in the above description or shown in the accompanying drawings shall be interpreted as illustrative and not in a limiting sense.

I claim:

1. A thermostatic device comprising a pivoted lever, a thermostatic element having one end fixed to the lever at a point spaced from the pivotal axis of the lever and extending in the direction toward the pivotal axis of the lever, said element being arranged for thermostatic bending in the plane of rotation of the lever, and means for restraining movement of the other end of the element whereby thermostatic bending of the element is translated into rotary motion of the lever, said thermostatic element comprising a normally straight blade extending generally parallel to the lever and past the pivotal axis of the lever.

2. A thermostatic device comprising a lever pivoted at a point intermediate its ends, a first thermostatic element having one end fixed to the lever at one end of the lever and extending on one side of the lever in the plane of rotation of the lever back toward the other end of the lever, a second thermostatic element having one end fixed to the lever at the other end of the lever and extending on the other side of the lever in the plane of rotation of the lever back toward said one end of the lever, said elements being arranged for opposite thermostatic bending in the plane of rotation of the lever, and means for restraining movement of the other ends of the elements.

3. A thermostatic device as set forth in claim 2 wherein each thermostatic element comprises a normally straight blade extending generally parallel to the lever and past the pivotal axis of the lever.

4. A thermostatic device comprising an S-shaped unit mounted for rotation on an axis at the center of the S, each of the outer portions of the S comprising a thermostatic element adapted to bend in the plane of the S, said elements being arranged to bend in opposite directions in said plane on temperature change, and means engaging the ends of the S for restraining movement of said ends whereby thermostatic bending of said elements is translated into rotary motion of the central portion of the S.

5. A thermostatic device comprising a thermostatic element having one end mounted for rotation about an axis and having its other end free, an abutment engageable by the free end of the element, said element being free for rotation about said axis to carry its free end toward and away from said abutment, and means biasing the element to rotate in the direction toward the abutment for engagement of its free end with the abutment, whereby thermostatic bending of the element is translated into rotary motion of said one end of the element about said axis.

6. A thermostatic device comprising a rotary member, a thermostatic element having one end secured to the rotary member at a point spaced from the axis of rotation of said member and having its other end free, an abutment engageable by the free end of the element, said element being free for rotation about said axis to carry its free end toward and away from said abutment and means biasing said member and element to rotate in the direction for engagement of the free end of the element with the abutment, whereby thermostatic bending of the element is translated into rotary motion of the rotary member.

7. A thermostatic device as set forth in claim 6 wherein the thermostatic element comprises a blade arranged for bending in the plane of rotation of the rotary member.

8. A thermostatic device comprising a pivoted lever, a thermostatic element having one end fixed to the lever at a point spaced from the pivotal axis of the lever and extending in the direction toward the pivotal axis of the lever, said element having its other end free and being arranged for thermostatic bending in the plane of rotation of the lever, an abutment engageable by the free end of the element, said element being free for rotation about said axis to carry its free end toward and away from said abutment, and means biasing the lever and element to rotate in the direction for engagement of the free end of the element with the abutment, whereby thermostatic bending of the element is translated into rotary motion of the lever.

9. A thermostatic device as set forth in claim 8 wherein the thermostatic element comprises a normally straight blade extending generally parallel to the lever and past the pivotal axis of the lever.

10. A thermostatic device comprising a lever pivoted at a point intermediate its ends, a first thermostatic element having one end fixed to the lever at one end of the lever and extending on one side of the lever in the plane of rotation of the lever back toward the other end of the lever, a second thermostatic element having one end fixed to the lever at the other end of the lever and extending on the other side of the lever in the plane of rotation of the lever back toward said one end of the lever, said elements having their other ends free and being arranged for opposite thermostatic bending in the plane of rotation of the lever, abutments engageable by the free ends of the elements, and means biasing the lever and elements to rotate in the direction for engagement of the free ends of the elements with the abutments.

11. A thermostatic device as set forth in claim 10 wherein each thermostatic element comprises a normally straight blade extending generally parallel to the lever and past the pivotal axis of the lever.

12. A thermostatic device comprising an S-shaped unit mounted for rotation on an axis at the center of the S, each of the outer portions of the S comprising a thermostatic element adapted to bend in the plane of the S, said elements being arranged to bend in opposite directions in said plane on temperature change, the ends of the S being free, abutments engageable by the free ends of the S, and means biasing the S to rotate in the direction for engagement of its free ends with said abutment, whereby thermostatic bending of said elements is translated into rotary motion of the central portion of the S.

13. A thermostatic switch comprising a thermostatic element having one end mounted for rotation about an axis and its other end free, a fixed contact engageable by the free end of the element, means biasing the element to rotate in the direction for engagement of its free end with said contact, said contact acting to restrain movement of the free end of the element whereby thermostatic bending of the element is translated into rotary motion of said one end of the element about said axis, and means responsive to said rotary motion of said one end of the element about said axis beyond a predetermined limit for rotating the element in the opposite direction to move its free end away from said fixed contact.

14. A thermostatic switch comprising a rotary member, a thermostatic element having one end secured to the rotary member at a point spaced from the axis of rotation of said member and having its other end free, a fixed contact engageable by the free end of the element, means biasing the rotary member and element to rotate in the direction for engagement of the free end of the element with said contact, said contact acting to restrain movement of the free end of the element whereby thermostatic bending of the element is translated into rotary motion of said rotary member, and means responsive to said rotary motion of said rotary member beyond a predetermined limit for rotating the rotary member and element in the opposite direction to move the free end of the element away from said fixed contact.

15. A thermostatic switch as set forth in claim 14 wherein the thermostatic element comprises an electrically conductive blade arranged for bending in the plane of rotation of the rotary member and having a contact at its free end engageable with the fixed contact.

16. A thermostatic switch comprising a pivoted lever, a thermostatic element having one end fixed to the lever at a point spaced from the pivotal axis of the lever and extending in the direction toward the pivotal axis of the lever, said element having its other end free and being arranged for thermostatic bending in the plane of rotation of the lever, a fixed contact engageable by the free end of the element, means biasing the lever and element to rotate in the direction for engagement of the free end of the element with said contact, said contact acting to restrain movement of the free end of the element whereby thermostatic bending of the element is translated into rotary motion of the lever, and means responsive to said rotary motion of said lever beyond a predetermined limit for rotating the lever and element in the opposite direction to move the free end of the element away from said fixed contact.

17. A thermostatic switch as set forth in claim 16 wherein the thermostatic element comprises a normally straight electrically conductive blade extending generally parallel to the lever and past the axis of the lever and having a contact at its free end engageable with the fixed contact.

18. A thermostatic switch comprising a lever pivoted at a point intermediate its ends, a first thermostatic element having one end fixed to the lever at one end of the lever and extending on one side of the lever in the plane of rotation of the lever back toward the other end of the lever, a second thermostatic element having one end fixed to the lever at the other end of the lever and extending on the other side of the lever in the plane of rotation of the lever back toward said one end of the lever, said elements having their other ends free and being arranged for opposite thermostatic bending in the plane of rotation of the lever, fixed contacts engageable by the free ends of the elements, means biasing the lever and elements to rotate in the direction for engagement of the free ends of the elements with said contacts, said contacts acting to restrain movement of the free ends of the elements whereby thermostatic bending of the elements is translated into rotary motion of the lever, and means responsive to said rotary motion of the lever beyond a predetermined limit for rotating the lever and elements in the opposite direction to move the free ends of the elements away from said fixed contacts.

19. A thermostatic switch as set forth in claim 18 wherein the lever is electrically conductive, and each thermostatic element comprises a normally straight electrically conductive blade extending generally parallel to the lever and past the axis of the lever and having a contact at its free end engageable with the respective fixed contact.

20. A thermostatic switch as set forth in claim 18 wherein the means responsive to rotary motion of the lever comprises a spring-biased driver for the lever, and latch means carried by the lever for normally latching the driver in an operative position against its spring bias.

21. A thermostatic switch comprising an electrically conductive S-shaped unit mounted for rotation on an axis at the center of the S, each of the outer portions of the S comprising a thermostatic element adapted to bend in the plane of the S, said elements being arranged to bend in opposite directions in said plane on temperature change, the ends of the S being free, fixed contacts engageable by the free ends of the S, means biasing the S to rotate in the direction for engagement of its free ends with said contacts, whereby thermostatic bending of said elements is translated into rotary motion of the central portion of the S, and means responsive to said rotary motion of the central portion of the S beyond a predetermined limit for rotating the S in the opposite direction to move its free ends away from said fixed contacts.

22. A thermostatic device comprising a thermostatic element having one end mounted for rotation about an axis and having its other end free, an abutment engageable by the free end of the element, said element being free for rotation about said axis to carry its free end toward and away from said abutment, said element being biased to rotate in the direction for engagement of its free end with the abutment, whereby thermostatic bending of the element is translated into rotary motion of said one end of the element about said axis, and means responsive to rotation of said one end of the element about said axis beyond a predetermined limit for rapidly rotating said element in the opposite direction against the bias on said element.

23. A thermostatic device comprising a rotary member, a thermostatic element having one end secured to the rotary member at a point spaced from the axis of rotation of said member and having its other end free, an abutment engageable by the free end of the element, said element being free for rotation about said axis to carry its free end toward and away from said abutment, said member and element being biased to rotate in the direction for engagement of the free end of the element with the abutment, whereby thermostatic bending of the element is translated into rotary motion of the rotary member, and means responsive to said rotary motion of said rotary member beyond a predetermined limit for rapidly rotating the rotary member and element in the opposite direction against the bias on said rotary member and element.

24. A thermostatic device as set forth in claim 23 wherein the thermostatic element comprises a blade arranged for bending in the plane of rotation of the rotary member.

25. A thermostatic device comprising a pivoted lever, a thermostatic element having one end fixed to the lever at a point spaced from the pivotal axis of the lever and extending in the direction toward the pivotal axis of the lever, said element having its other end free and being arranged for thermostatic bending in the plane of rotation of the lever, an abutment engageable by the free end of the element, said element being free for rotation about said axis to carry its free end toward and away from said abutment, said lever and element being biased to rotate in the direction for engagement of the free end of the element with the abutment, whereby thermostatic bending of the element is translated into rotary motion of the lever, and means responsive to said rotary motion of said lever beyond a predetermined limit for rapidly rotating the lever and element in the opposite direction against the bias on said lever and element.

References Cited in the file of this patent

UNITED STATES PATENTS

| | | |
|---|---|---|
| Re.16,940 | Massa | Apr. 24, 1928 |
| 1,544,549 | Barnett | July 7, 1925 |
| 1,639,655 | Holley | Aug. 23, 1927 |
| 1,641,170 | Karlson | Sept. 6, 1927 |
| 1,678,841 | Aalborg | July 31, 1928 |